United States Patent [19]
Iwai et al.

[11] Patent Number: 5,182,676
[45] Date of Patent: Jan. 26, 1993

[54] TURN-OVER TYPE REARVIEW DOOR MIRROR

[75] Inventors: Noriyuki Iwai; Kimito Sasaki, both of Saitama; Masaru Yano, Miyazaki; Fumiyoshi Wakimoto, Miyazaki; Wataru Tokunaga, Miyazaki; Masaru Shirakura, Miyazaki, all of Japan

[73] Assignees: Honda Giken Kogyo Kabushiki Kaisha; Kabushiki Kaisha Honda Lock, both of Japan

[21] Appl. No.: 697,930

[22] Filed: May 2, 1991

Related U.S. Application Data

[63] Continuation of Ser. No. 386,582, Jul. 28, 1989, abandoned.

[30] Foreign Application Priority Data

| Aug. 4, 1988 | [JP] | Japan | 63-103771[U] |
|---|---|---|---|
| Aug. 4, 1988 | [JP] | Japan | 63-103772[U] |
| Aug. 4, 1988 | [JP] | Japan | 63-103773[U] |
| Aug. 4, 1988 | [JP] | Japan | 63-103774[U] |
| Aug. 4, 1988 | [JP] | Japan | 63-103775[U] |
| Aug. 12, 1988 | [JP] | Japan | 63-107282[U] |
| Aug. 12, 1988 | [JP] | Japan | 63-202097 |

[51] Int. Cl.$^5$ .......................... G02B 7/18; B60R 1/06
[52] U.S. Cl. ........................ 359/841; 359/874; 359/875; 248/480; 248/484; 248/487
[58] Field of Search ............... 350/604, 606, 626, 632, 350/633, 635, 636; 248/478, 479, 480, 481, 484, 485, 486, 487; 359/873, 874, 875, 841, 872

[56] References Cited

U.S. PATENT DOCUMENTS

| 4,636,045 | 1/1987 | Suzuki | 350/606 |
|---|---|---|---|
| 4,660,944 | 4/1987 | Suzuki et al. | 248/487 |
| 4,783,161 | 11/1988 | Shamoto | 350/635 |
| 4,856,886 | 8/1989 | Polzer et al. | 350/636 |
| 4,913,543 | 4/1990 | Haba et al. | 248/484 |

FOREIGN PATENT DOCUMENTS

| 0074753 | 3/1983 | European Pat. Off. | 350/635 |
|---|---|---|---|
| 0013234 | 2/1981 | Japan | 350/635 |
| 0122047 | 6/1986 | Japan | 350/635 |
| 0221949 | 9/1987 | Japan | 350/604 |
| 0053140 | 3/1988 | Japan | 350/635 |

Primary Examiner—Bruce Y. Arnold
Assistant Examiner—R. D. Shafer
Attorney, Agent, or Firm—Eckert Seamans Cherin & Mellott

[57] ABSTRACT

A retractable turn-over type rearview door mirror in which angular adjustment of the mirror member can be effected by manually operating an actuation lever. By using a certain linkage mechanism, a favorable correspondence is achieved between the direction of movement of the actuation lever and the direction of movement the mirror member. The use of a clutch unit permits the adjusted state of the mirror member to be conserved, even when the rearview door mirror is retracted and restored, by minimizing the influences of the retracting movement upon the linkage mechanism. This can be accomplished by applying a suitable amount of friction to the linkage mechanism, but, by using a lock lever which fixes the angular orientation of the mirror member when the rearview door mirror is retracted, the angular orientation of the mirror member may be kept fixed without requiring such a friction and it allows the operation of the actuation lever to be performed with a small force.

15 Claims, 9 Drawing Sheets

TURN-OVER TYPE REARVIEW DOOR MIRROR

This is a continuation, of application Ser. No. 386,582, filed Jul. 28, 1989, now abandoned.

TECHNICAL FIELD

The present invention relates to a turn-over type rearview door mirror for vehicles which allows the orientation of its mirror member to be manually adjusted from a passenger compartment, and, additionally, to be retracted along the fore-and-aft direction of the vehicle.

BACKGROUND OF THE INVENTION

Conventionally, according to a rearview door mirror of this type, the orientation of the mirror member may be adjusted in the lateral direction or its angular orientation around a vertical axis by laterally moving an actuation lever projecting into the passenger compartment, but the adjustment of the mirror member in the fore-and-aft direction or its angular orientation around a horizontal axis is made possible by moving the actuation lever in the vertical direction. However, according to conventional rearview door mirrors of this type, there was a feel of a certain discrepancy between the directions of the movement of the actuation lever and the movement of the mirror member, and, therefore, it has been desired to provide a manually adjustable rearview door mirror which is free from such an inconvenience without requiring any complex structure.

Also, such rearview door mirrors are required to be retractable, and they can be typically folded around a vertical pivot axis closely upon a side of the vehicle body so that the effective width of the vehicle may be minimized when required, for instance, in narrow alleys and densely packed car carrier ships and parking garages. The linkage mechanism for effecting the angular adjustment of the mirror member in such a retractable rearview door mirror is required to be protected from the interferences arising from the retracting movement of the rearview door mirror. This is typically accomplished by using a spring loaded clutch which becomes disengaged when an excessive force is applied thereto, and applying a suitable amount of friction to the actuation lever end of the linkage mechanism to make it relatively immune from the force applied to the mirror member end of the linkage mechanism. However, if this friction is excessive, the force required to operate the action lever becomes excessive. Conversely, if the friction is insufficient, the angular orientation of the mirror member is altered by the retraction of the rearview door mirror, and the angular adjustment of the mirror member is required every time the rearview door mirror is restored from its retracted state to its normal position. It is not always easy to achieve a suitable amount of friction and, in either case, it has been often the case that the user encounters a considerably inconvenience.

BRIEF SUMMARY OF THE INVENTION

In view of such problems of the prior art, a primary object of the present invention is to provide a rearview door mirror for vehicles according to which the directions of the movement of the mirror member and the movement of the actuation lever for effecting the angular adjustment of the mirror member agree with one another and the user may feel comfortable when operating the actuation lever.

A second object of the present invention is to provide a retractable rearview door mirror for vehicles which is simple in structure.

A third object of the present invention is to provide a retractable rearview door mirror for vehicles which requires only a light force for manually operating the same.

A fourth object of the present invention is to provide a retractable rearview door mirror for vehicles which is not required to be readjusted every time the rearview door mirror is restored from its retracted state to its normal position.

According to the present invention, these and other objects of the present invention can be accomplished by providing a turn-over type rearview door mirror for vehicles, comprising: a stay member securely attached to a vehicle door and carrying a base member; a mirror visor pivotally supported by the base member around a vertical retraction pivot axis; detent means for retaining the mirror visor at its fully extended position and at its fully retracted position; a mirror member received in the mirror visor so as to face rearward via a mirror holder and pivotally supported thereby so as to be able to be angularly moved around a horizontal axial line and a vertical axial line; a lateral rod passed through the vehicle door so as to be vertically slidable and rotatable around a vertical pivot axis located at its inner end; knob means coupled with an inner end of the lateral rod via an actuation linkage mechanism for converting a lateral rotative movement of the knob means around a vertical axial line and a rotative movement of the knob means around another axial line extending substantially perpendicularly to the vehicle door into and the rotative movement around the vertical pivot axis and the vertical sliding movement of the lateral rod, respectively; a vertical driven rod disposed in parallel or, more preferably coaxial with the retraction pivot axis and guided so as to be rotatable around and slidable along its central axial line; a first arm member extending laterally from a lower end of the vertical driven rod and pivotally and telescopically coupled with a free end of the lateral rod at its free end for converting the vertical sliding movement and the rotative movement of the lateral rod into the sliding movement and the rotative movement of the vertical driven rod, respectively; a mirror actuating arm projecting from a part of a reverse surface of the mirror member displaced from an intersection of the horizontal axial line and the vertical axial line of the mirror member; a second arm member extending laterally from an upper end of the vertical driven rod and pivotally coupled with a free end of the mirror actuating arm at its free end for converting the vertical sliding movement and the rotative movement of the vertical driven rod into the angular movement of the mirror member around the horizontal axial line and the vertical axial line; and a clutch unit interposed between a base end of the second arm member and the upper end of the first vertical driven rod, consisting of a first cam part provided at the upper end of the vertical driven rod, a second cam part provided at the base end of the second arm member for cooperation with the first cam part, and a spring member urging one of the two cam parts towards one another so as to elastically allow the second arm member, along with the mirror visor, to be turned around the vertical driven rod against a biasing force of the spring member which tends to restore the second arm member to a neutral position with respect to the vertical driven rod.

Alternatively, the present invention provides a turn-over type rearview door mirror for vehicles, comprising: a stay member securely attached to a vehicle door and carrying a base member; a mirror visor pivotally supported by the base member around a vertical retraction pivot axis; detent means for retaining the mirror visor at its fully extended position and at its fully retracted position; a mirror member received in the mirror visor so as to face rearward and pivotally supported thereby so as to be able to be angularly moved around a horizontal axial line and a vertical axial line; a lateral rod passed through the vehicle door so as to be rotatable around and slidable along its central axial line; knob means coupled with an inner end of the lateral rod via an actuation linkage mechanism for converting a lateral rotative movement of the knob means around a vertical axial line and a rotative movement of the knob means around another axial line extending substantially perpendicularly to the vehicle door into the sliding movement and the rotative movement of the lateral rod, respectively; a vertical driven rod provided adjacent an outer end of the lateral rod and guided so as to be rotatable around and slidable along its central axial line; a first arm member extending laterally from a lower end of the vertical driven rod and pivotally coupled with the outer end of the lateral rod at its free end for converting the rotative movement and sliding movement of the lateral rod into the sliding movement and the rotative movement of the first vertical driven rod, respectively; a mirror actuating arm projecting from a part of a reverse surface of the mirror member displaced from an intersection of the horizontal axial line and the vertical axial line of the mirror member; a conversion arm, having a pivot axis extending in parallel with the retraction pivot axis, for converting the vertical sliding movement and the rotative movement of the vertical driven rod into the angular movements of the mirror member around the horizontal axial line and the vertical axial line, respectively; and a clutch unit interposed between an upper end of the first vertical rod and a corresponding end of the conversion arm, consisting of a first cam part provided at the upper end of the vertical driven rod, a second cam part provided at the base end of the conversion arm for cooperation with the first cam part, and a spring member urging one of the two cam parts towards one another so as to elastically allow the second conversion arm, along with the mirror visor, to be turned around the vertical driven rod against a biasing force of the spring member which tends to restore the conversion arm to its neutral position with respect to the vertical driven rod.

Thus, there is a favorable correspondence between the leftward and rightward rotative movement of the actuation lever around its central axis line and the upward and downward inclination of the mirror surface as well as between the leftward and rightward rotative movement of the actuation lever around a vertical pivot axis at its base end and the leftward and rightward inclination of the mirror surface. Additionally, the coupling between the external part and the internal part of the rearview mirror with respect to the vehicle door is so simple that the required assembling work is simplified, and the clutch unit permits the mirror visor to be retracted without interfering with the linkage mechanism for adjusting the angular orientation of the mirror member.

According to a structurally advantageous embodiment of the present invention, the knob means comprises a knob member which projects into a passenger compartment through an opening in the door so as to be rotatable around its own axial line and rotatable around a vertical axial line, and a vertical drive rod guided for a vertical movement and a rotative movement along and around its central axial line and having an L-shaped upper end which is coupled with an extension extending laterally from a base end of the knob member, the lateral rod integrally and laterally projecting from a lower part of the vertical drive rod. Preferably, the vertical drive rod consists of a tubular member and a vertical guide rod is passed through an inner hollow part of the vertical drive rod.

According to an advantageous aspect of the present invention, a base end of the mirror actuating arm is integrally connected to a middle part of a vertical bar member which is pivotally coupled with a reverse surface of the mirror member at its either end in a symmetric relationship with respect to the horizontal axial line. Thus, as compared with a conventional arrangement in which the base end of the mirror actuation arm is simply pivotally attached, via a vertical pivot pin, to a part of the reverse surface of the mirror holder located on the horizontal X-axis, since the base end of the actuating arm is in effect bifurcated into two ends which are attached to the parts of the reverse surface of the mirror holder spaced from the horizontal X-axis, the angular movement of the mirror member, in particular around the horizontal X-axis, may be effected involving a minimum amount of play.

According to a certain inventive concept of the present invention, there is provided a turn-over type rearview door mirror for vehicles, comprising: a stay member securely attached to a vehicle door and carrying a base member; a mirror visor pivotally supported by the base member around a vertical retraction pivot axis; detent means for retaining the mirror visor at its fully extended position and at its fully retracted position; a mirror member received in the mirror visor so as to face rearward via a mirror holder and pivotally supported thereby so as to be able to be angularly moved around a horizontal axial line and a vertical axial line; knob means projecting from the door into a passenger compartment; a vertical driven rod disposed in parallel with the retraction pivot axis and guided so as to be rotatable around and slidable along its central axial line; linkage means for converting a lateral rotative movement of the knob means around a vertical axial line and a rotative movement of the knob means around another axial line extending substantially perpendicularly to the vehicle door into the rotative movement and the sliding movement of the vertical driven rod, respectively; a mirror actuating arm projecting from a part of a reverse surface of the mirror member displaced from an intersection of the horizontal axial line and the vertical axial line of the mirror member; an arm member extending laterally from an upper end of the vertical driven rod and pivotally coupled with a free end of the mirror actuating arm at its free end via a transmission mechanism for converting the rotative movement and the sliding movement of the vertical driven rod into the angular movement of the mirror member around the vertical axial line and the horizontal axial line, respectively; and brake means interposed between the mirror member and the mirror visor for selectively retaining a current angular position of the mirror member with respect to the mirror visor when the mirror visor is retracted from a neutral position around the retraction pivot axis.

According to this feature of the present invention, since there is no need to deliberately apply a suitable amount of frictional force to a moving part of the actuation lever or other part of the linkage mechanism in order to keep the linkage mechanism immobile during the retraction movement of the mirror visor, the operation of the actuation lever during the normal adjustment of the angular orientation of the mirror member can be made with a very small force.

If the locking and unlocking of the mirror member can be accomplished through the retraction movement of the mirror visor, a particularly favorable result can be obtained. Therefore it is desirable that the rearview door mirror further comprises brake means actuating means comprising a first part attached to the mirror visor and a second part attached to the base member so as to cooperate with another and activate the brake means when the mirror visor is retracted from its neutral position around the retraction pivot axis.

Such brake means actuation means may be achieved in a number of ways, but, according to a preferred embodiment of the present invention, the brake means comprises a brake lever pivotally supported by the mirror visor and biasing means, the brake lever being provided with a first end which is adapted to cooperate with a cam surface provided in the base member of the stay member and a second end which is adapted to lock up the mirror holder of the mirror member when the first end is brought into contact with a cam nose part of the cam surface against a biasing force of the biasing means which normally urges the second end out of locking up the mirror holder. Further, the cam surface is provided in a horizontal plane of the base member surrounding the retraction pivot axis, and the pivot axis of the brake lever extends substantially perpendicular to a major surface of the mirror member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
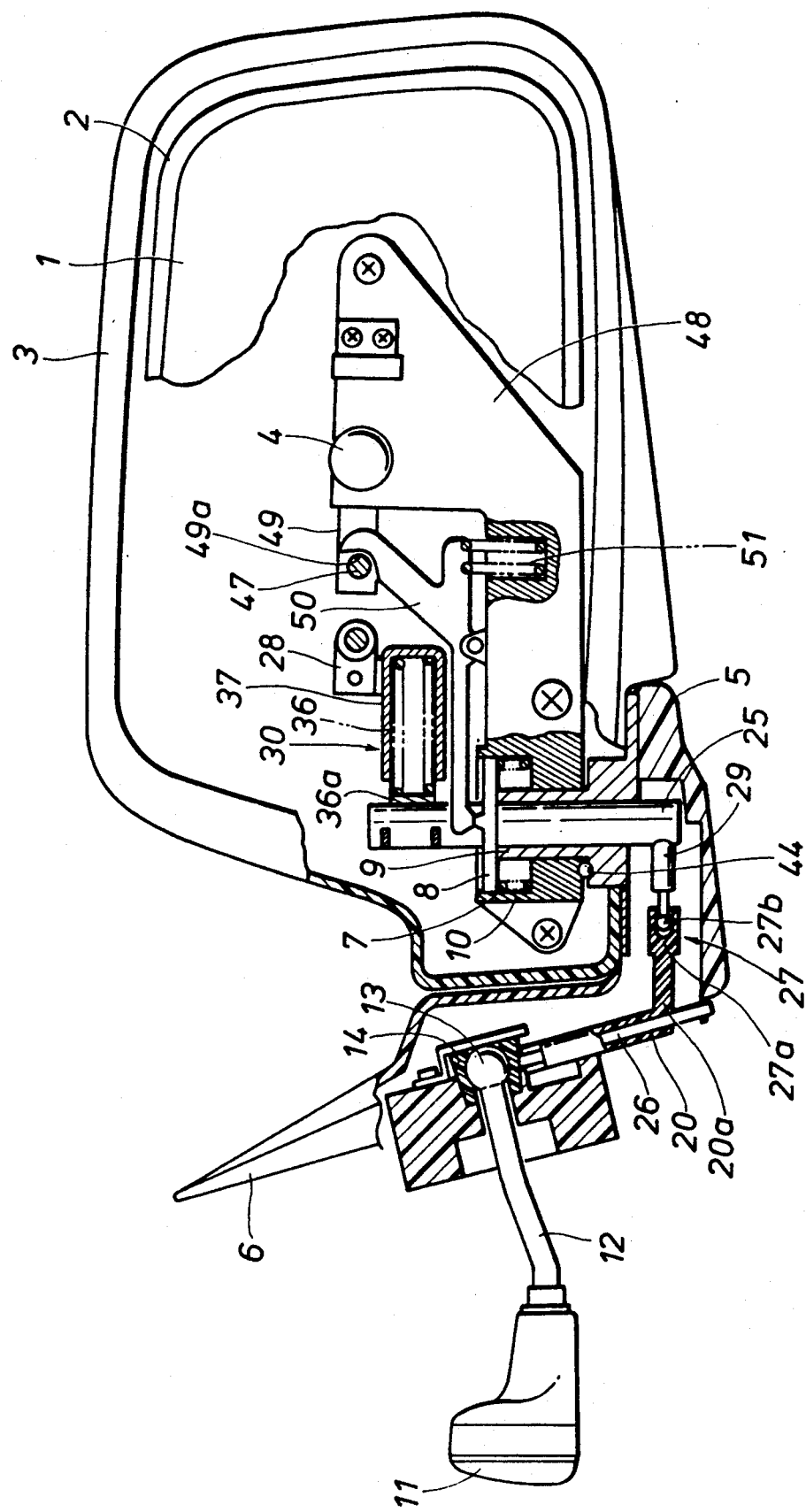
FIG. 1 is a partly broken away front view of a first embodiment of the retractable rearview door mirror according to the present invention.
Figure 2:
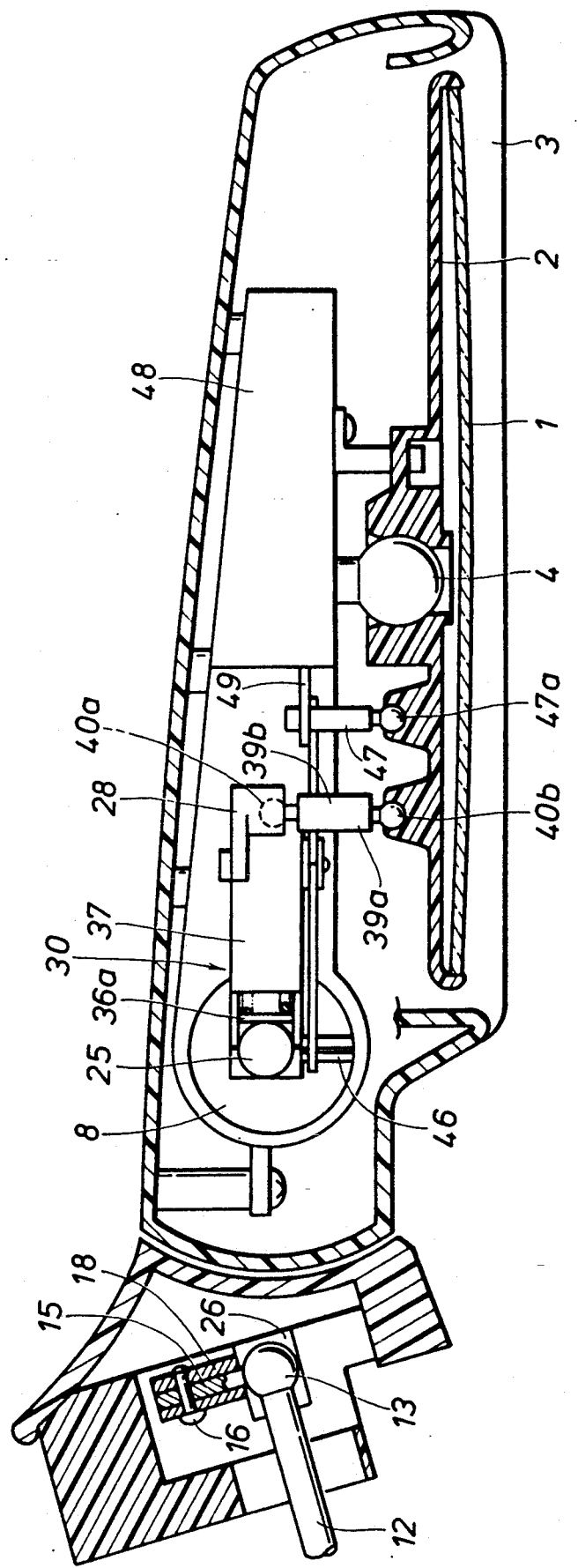
FIG. 2 is a sectional plan view of the first embodiment shown in FIG. 1.

As shown in FIGS. 1 and 2, a mirror member 1 is securely supported by a mirror holder 2 which is in turn pivotally supported by a mirror visor 3 by way of a ball pivot 4, and the mirror member 1 is constrained to rotate around a horizontal X-axis and a vertical Y-axis by guide means which is conventional and is therefore not shown in the drawings in any detail.

The mirror visor 3 is supported by a pivot boss 9 projecting upright from a base 5 extending from a mounting stay 6 attached to a side of a vehicle door (not shown in the drawings) so as to be retracted in either forward or rearward direction, and the pivot boss 9 is surrounded by an outer sleeve 10 for receiving a coil spring 7 therein in concentric relationship. The coil spring 7 is received between an annular cam plate 8 which is securely attached to the upper end of the pivot boss 9 and a seat surface of the outer sleeve 10 in compressed state for elastically supporting the mirror visor 3 on the base 5 via a plurality of ball clutches 44 interposed between the lower surface of the outer sleeve 10 and the seat surface surrounding the pivot boss 9.

Figure 3:
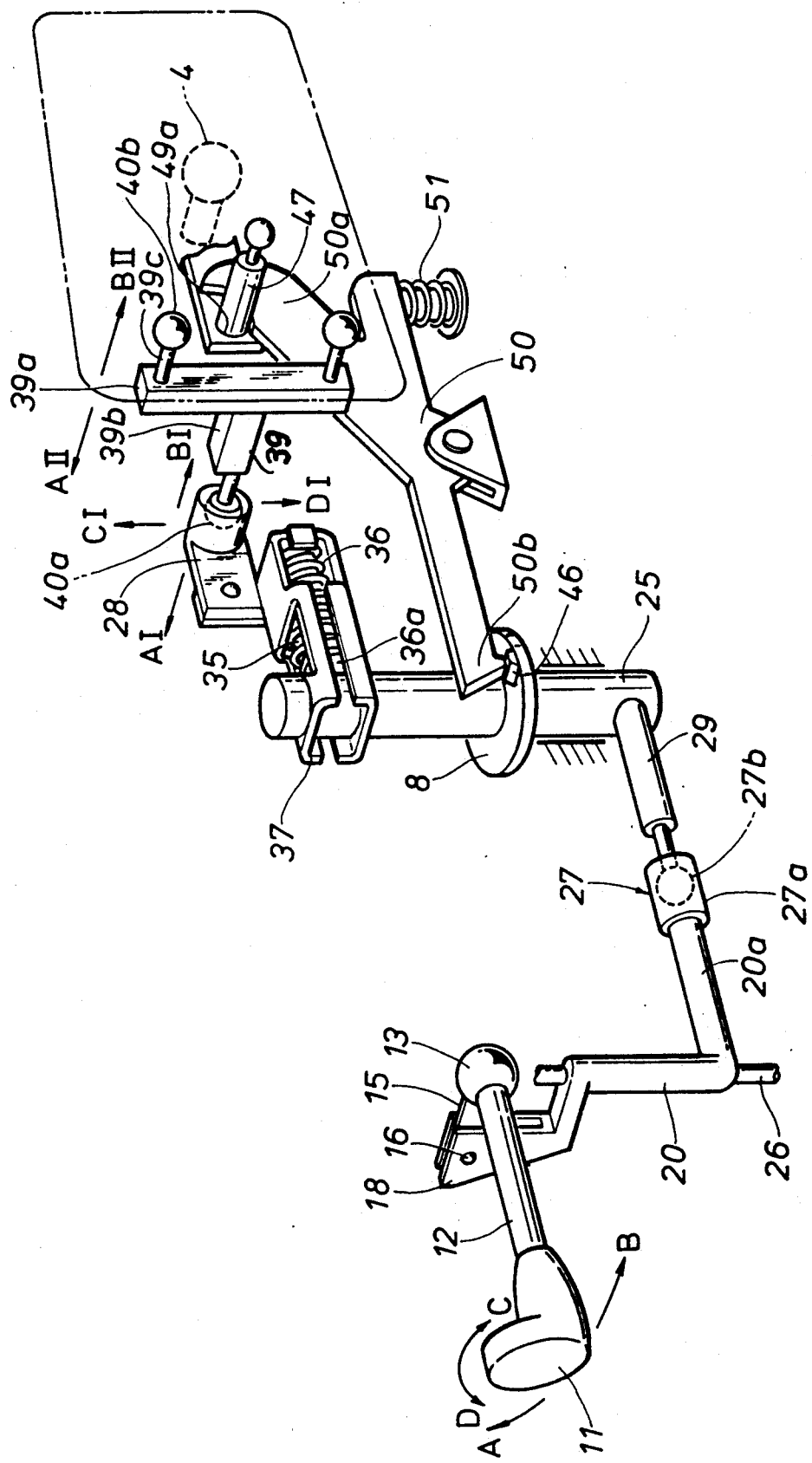
FIG. 3 is a perspective view showing the linkage mechanism of the first embodiment for converting the movement of the knob of the actuation lever into the angular movement of the mirror member.

As shown in FIGS. 1, 2 and 3, an actuation lever 12 projects into the passenger compartment; the inner end of the actuation lever 12 is provided with a knob 11 and the outer end of the actuation lever 12 outer end is integrally provided with a pivot ball 13 which is received in and frictionally engaged by a pivot ball holder 14 attached to the mounting stay 6. Thus, the actuation lever 12 can be rotated either around a approximately vertical axis passing through the pivot ball 13 (directions A and B indicated in FIG. 3) or around its own central axial line also passing through the pivot ball 13 (directions C and D indicated in FIG. 3) by means of the knob 11. An extension arm 15 extends laterally from the pivot ball 13, and a free end of this extension arm 15 is pivotally coupled with an upper end of an L-shaped swing piece 18 via a connecting pin 16. The lower end of the swing piece 18 is integrally connected with a hollow vertical drive rod 20 which extends along the vertical axial line passing through the pivot ball 13 and is slidably fitted upon a guide rod 26 extending integrally from the stay 6. Thus, the fore-and-aft movement and the clockwise and counter-clockwise rotation of the actuation lever 12 having the pivot ball 13 at its base end are converted into the rotative movement and the vertical sliding movement of the hollow vertical drive rod 20, respectively, via the lateral movement and the vertical movement of the swing piece 18.

The lower end of the vertical drive rod 20 is provided with a lateral rod 20a extending integrally and horizontally therefrom. The free end of the lateral rod 20a is coupled with a socket 27a of a ball pivot joint 27. A vertical driven rod 25 is passed coaxially through the pivot boss 9 so as to be both vertically slidable and rotatable around its own central axial line. A first arm 29 extending laterally from a lower part of the vertical driven rod 25 is integrally provided with a ball 27b of the ball pivot joint 27. The ball 27b is received in the socket 27a so as to transmit the movement of the vertical drive rod 20 resulting from the movement of the actuation lever 12 to the vertical driven rod 25. Specifically, the vertical movement of the vertical drive rod 20 is transmitted as the corresponding vertical movement of the vertical driven rod 25 in the same direction. However, the rotative movement of the vertical drive rod 20 is transmitted as the rotative movement of the vertical driven rod 25 in opposite direction. The upper end of the vertical driven rod 25 is coupled, via a clutch unit 30, with a conversion arm 28 for converting the rotative movement and the vertical movement of the vertical driven rod 25 into the rotative movement of the mirror member 1 around the vertical Y-axis and the horizontal X-axis via the mirror holder 2 as described hereinafter.

Figure 4:
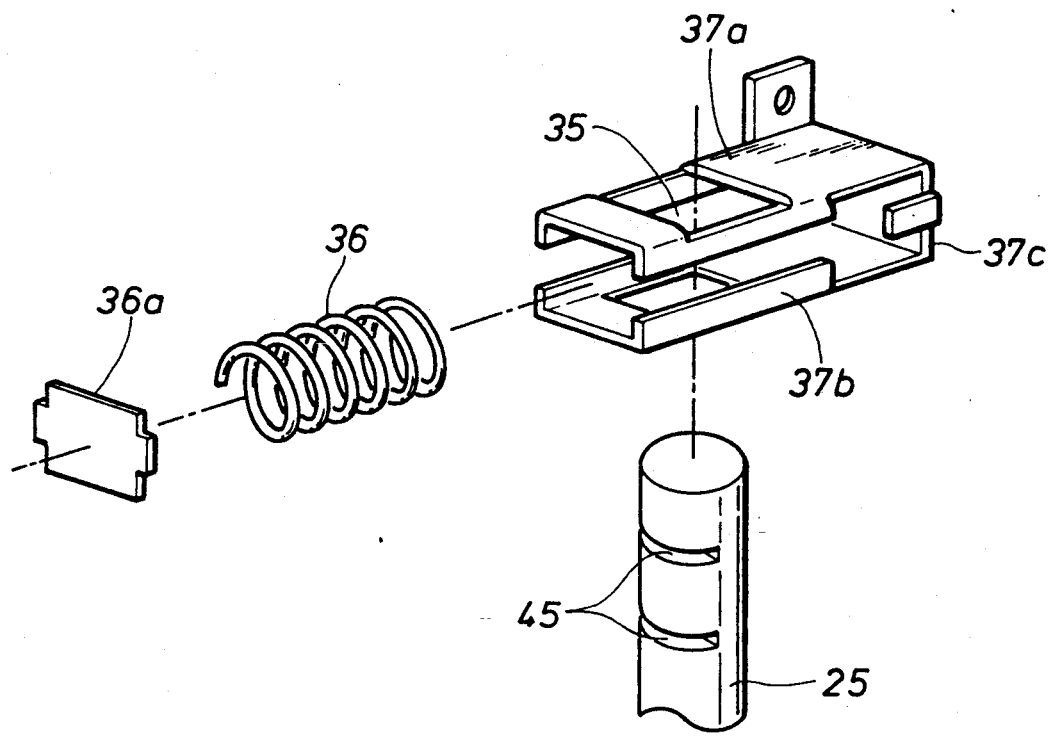
FIG. 4 is a fragmentary exploded perspective view of the clutch mechanism of the first embodiment for allowing the mirror visor to be retracted without interfering with the linkage mechanism.

As best shown in FIG. 4, the clutch unit 30 is provided with a frame 37, serving as a second arm having an upper plate member 37a and a lower plate member 37b which are spaced from one another and connected with each other by a bottom plate member 37c at its end remote from the vertical drive shaft 25 so as to define a cavity by these plate members 37a, 37b and 37c. The upper and lower plate members 37a and 37b of the frame 37 are each provided with a rectangular opening 35. The vertical driven rod 25 is passed through the openings 35, and a coil spring 36 is interposed between the bottom plate member 37c and the vertical driven rod 25 with a slide plate 36a interposed between the vertical driven rod 25 and the corresponding end of the coil spring 36. The parts of the vertical driven rod 25 in contact with the edges of the openings 35 are provided with slots 45. Each of the slots 45 has the shape of a crescent because the vertical driven rod 25 is provided with a circular cross section, and the slot 45 has a flat bottom. Thus, the linear edges of the openings 35 are normally in contact with the flat bottom surfaces of the slots 45, thereby defining a detent means.

Figure 5:
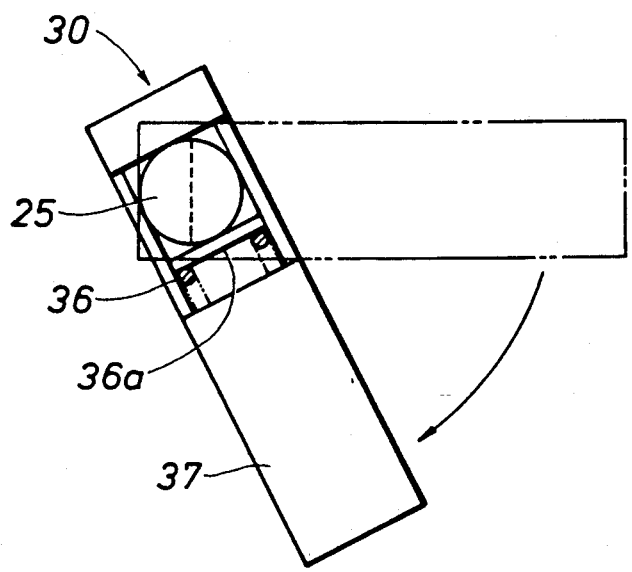
FIG. 5 is a plan view of the clutch mechanism of FIG. 4.

Thus, the clutch unit 30 normally transmits the vertical and rotative movements of the vertical drive 25 to the conversion arm 28, but if any excessive force, such as the one encountered when retracting the mirror visor 3, is applied thereto, the clutch unit 30 elastically permits the frame 37, along with the conversion arm 28, to be rotated relative to the vertical driven rod 25 around its central axial line as shown by plan view in FIG. 5.

The part of the reverse surface of the mirror holder 2 which is located on the horizontal X-axis but displaced towards the vehicle body by a certain distance from the vertical Y-axis is provided with a connecting rod unit 39 comprising a vertical bar 39a, a lateral bar 39b extending horizontally away from the mirror member 1 from a middle part of the vertical bar 39a, a ball pivot 40a provided at the free end of the lateral bar 39b, a pair of lateral bars 39c extending horizontally towards the mirror member 1 from either vertical end of the vertical bar 39a, and ball pivots provided at the free ends of the lateral bars 39c. The ball pivot 40a is coupled with the free end of the conversion arm 28 while the ball pivots 40b are coupled with the rear surface of the mirror holder 2 at points which are symmetric about the horizontal X-axis.

Figure 6:
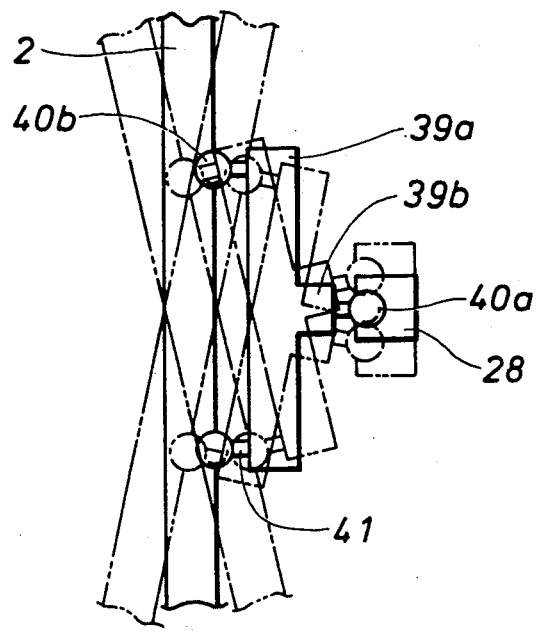
FIG. 6 is a schematic side view illustrating the action of the mechanism for adjusting the angle of the mirror member according to the present invention.
Figure 7:
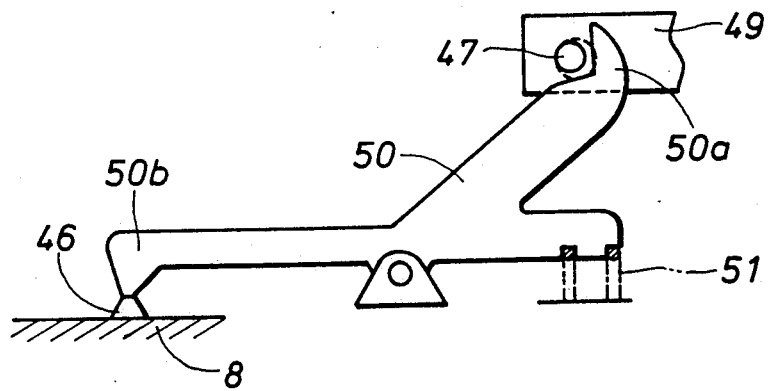
FIGS. 7 and 8 are side views of the lock lever for locking up the mirror member when the mirror visor is retracted, showing the two different states of the lock lever.
Figure 8:
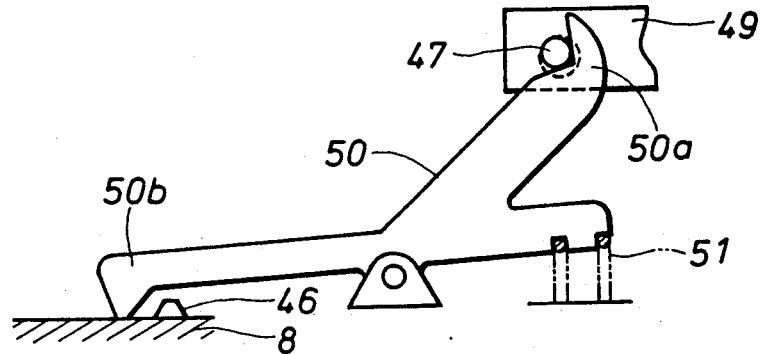
Figure 9:
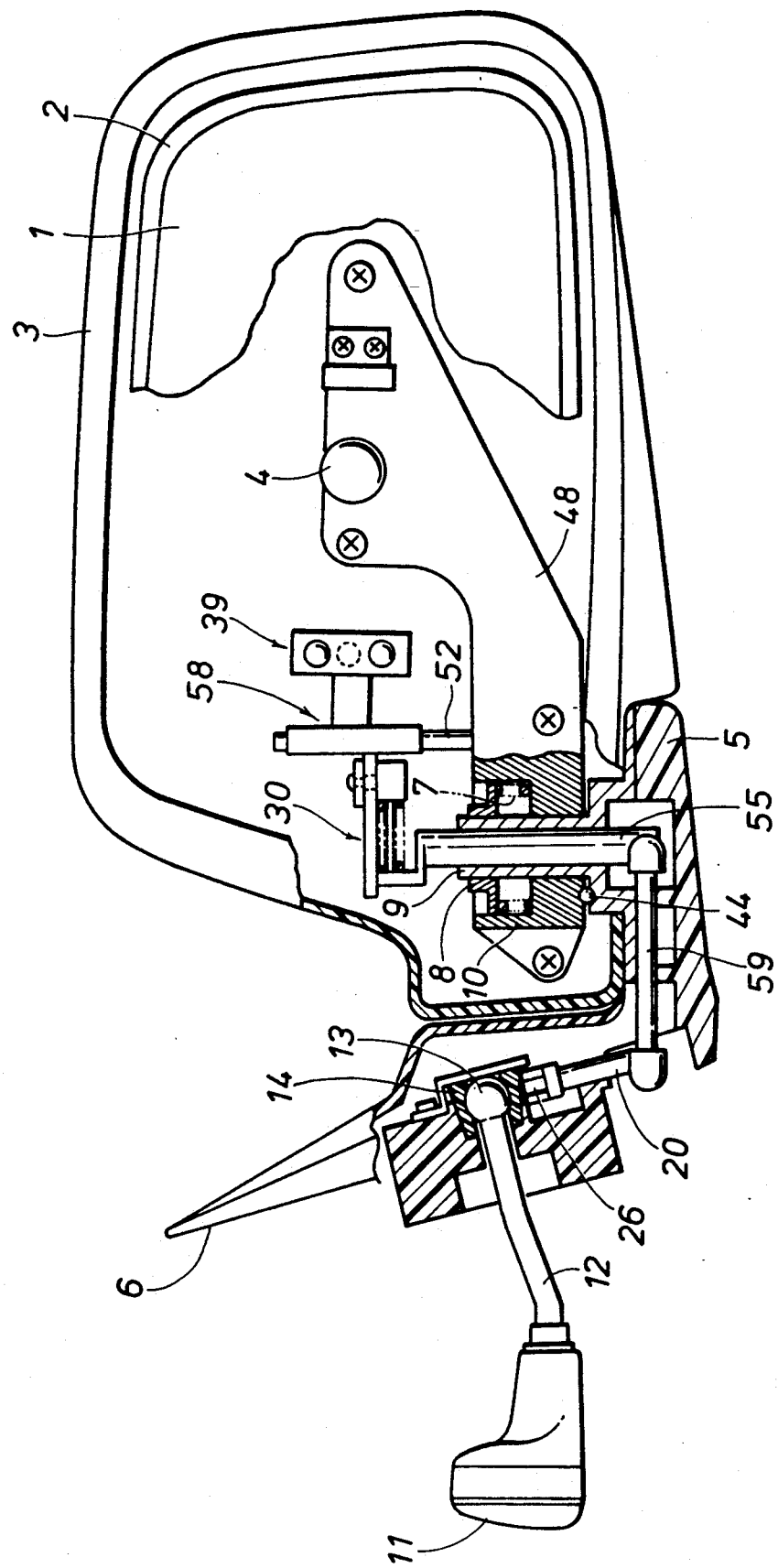
FIG. 9 is a partly broken away front view of a second embodiment of the retractable rearview door mirror according to the present invention.
Figure 10:
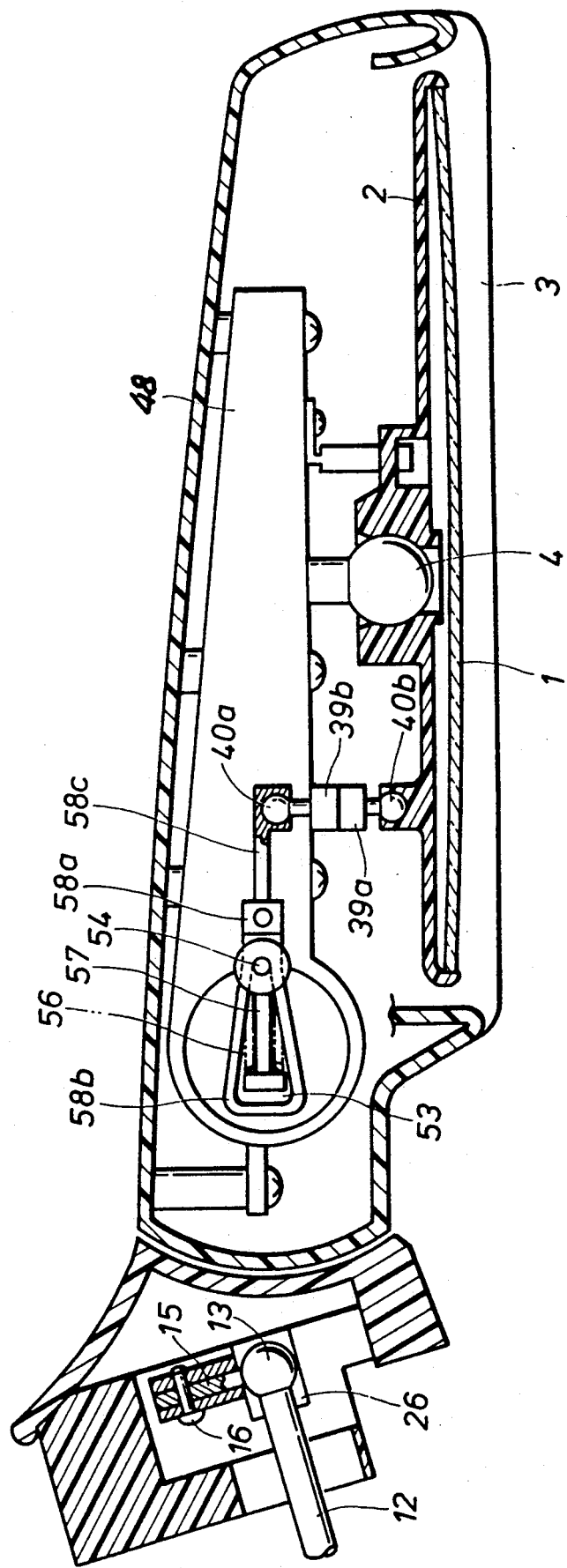
FIG. 10 is a sectional plan view of the second embodiment shown in FIG. 9.

Therefore, upward movement of the vertical driven rod 25 causes upward movement of the conversion arm 28 via the clutch unit 30 and, as the conversion arm 28 pushes up the lateral bar 39b of the connecting rod unit 39, the mirror 1 supported by the ball pivot 4 along with the mirror holder 2 is inclined rearward or the mirror surface is directed more downward, as shown by the imaginary lines in FIG. 6. Forward inclination of the mirror member 1 for directing the mirror surface more upward can be effected by the downward movement of the conversion arm 28 through downward movement of the vertical driven rod 25. The lateral inclination of the mirror member 1 is effected by the rotative movement of the vertical driven rod 25. Specifically, as the vertical driven rod 25 turns in clockwise direction as seen in the plan view of FIG. 2, the conversion arm 28 is turned in clockwise direction so that a force pushing the connecting rod unit 39 rearward out of the mirror visor 3 is produced and the mirror member 1 supported by the ball pivot 4 is turned in counter-clockwise direction as seen in the plan view of FIG. 2 around the vertical Y-axis. The counter-clockwise rotation of the vertical driven rod 25 causes the mirror member 1 to be inclined in the opposite direction through a reverse movement of the conversion arm 28.

The upper surface of the annular cam plate 8 is provided with a cam surface including a cam nose 46. A support rod 47 is pivotally coupled with a part of the reverse surface of the mirror holder 2 via a ball pivot 47a at its one end and is received in an opening 49a of a retainer 49. The retainer 49 is integrally formed with a bracket 48 which constitutes a main structural member of the mirror visor 3 and is also securely attached to the outer sleeve 10. A lock lever 50 for locking up the mirror holder 2 is pivotally supported by the bracket 48 at its middle part, and is further provided with an engagement end 50a which could be pushed sideways against a part of the support rod 47 immediately adjacent to its part received in the opening 49a under the spring force of a spring 51 and a cam follower end 50b abutting the cam surface of the annular cam plate 8.

When the cam follower end 50b of the lock lever 50 is riding upon the cam nose 46, the lock lever 50 is urged, against the spring force of the coil spring 51, in the direction for the engagement end 50a to be displaced away from the support rod 47 so that the movement of the support rod 47 into and out of the opening 49a is freely allowed, and the mirror holder 2 may be freely moveable or adjustable relative to the bracket 48. This state corresponds to the case when the mirror visor 3 is at its normal extended position. When the cam follower end 50b of the lock lever 50 is located at any other part of the cam surface of the cam plate 8, the engagement end 50a of the lock lever 50 is brought into engagement with the support rod 47 under the spring force of the coil spring 51 so that the movement of the support rod 47 into and out of the opening 49a is prohibited, and the mirror holder 2 becomes fixedly secured. As a result, the angular movement of the mirror holder 2, in particular around the vertical Y-axis is positively prevented. This state corresponds to the case when the mirror visor 3 is not at its normal extended position or, for instance, at its retracted position.

Now the operation of the present embodiment is described in the following.

When the mirror visor 3 is fully extended, by rotating the knob 11 to the left around the vertical axial line passing through the ball pivot 13 (in the direction A as indicated in FIG. 3), the vertical drive rod 20 is rotated in clockwise direction as seen from above via the extension arm 15 and the L-shaped swing piece 18, and this in turn causes the lateral rod 20a to be swung to the right as seen from above around the same vertical axial line. This is transmitted as a counter-clockwise rotation of the vertical driven rod 25 as seen from above via the ball joint 27 and the first arm 29, and the conversion arm 28 is swung away from the mirror member 1 as indicated by the arrow AI in FIG. 3. As a result, the mirror surface of the mirror member 1 is adjusted to face more towards the vehicle body through an angular movement around the vertical Y-axis.

Conversely, when the knob 11 is moved to the right or in the direction B as indicated in FIG. 3, the vertical drive rod 20 is rotated in counter-clockwise direction as seen from above, and this in turn causes the lateral rod 20a to be swung to the left as seen from above around the same vertical axial line. This is transmitted as a clockwise rotation of the vertical driven rod 25 as seen from above, and the conversion arm 28 is swung towards the mirror member 1 as indicated by the arrow BI in FIG. 3. As a result, the mirror surface of the mirror member 1 is adjusted to face more away from the vehicle body through an angular movement around the vertical Y-axis. Thus, there is a favorable correspondence between the leftward and rightward movement of the actuation lever 12 and the inward and outward inclination of the mirror surface.

When the actuation lever 12 is turned around its central axial line in clockwise direction (as indicated by the arrow C in FIG. 3), the L-shaped swing piece 18 along with the vertical drive rod 20 is lifted via the extension arm 15 and the pivot pin 16. The lateral rod 20a is also lifted, and this movement is transmitted to the conversion arm 28 as its upward movement (as indicated by the arrow CI in FIG. 3) via the ball joint 27, the first arm 29 and the vertical driven rod 25. Thus, the mirror member 1 is inclined rearward around the horizontal X-axis or directed more downward. Likewise, when the actuation lever 12 is turned around its central axial line in counter-clockwise direction (as indicated by the arrow D in FIG. 3), the L-shaped swing piece 18 along with the vertical drive rod 20 is lowered via the extension arm 15 and the pivot pin 16. The lateral rod 20a is also lowered, and this movement is transmitted to the conversion arm 28 as its downward movement (as indicated by the arrow DI in FIG. 3) via the ball joint 27, the first arm 29 and the vertical driven rod 25. Thus, the mirror member 1 is inclined forward around the horizontal X-axis or directed more upward. Thus, there is a favorable correspondence between the leftward and rightward rotative movement of the actuation lever 12 around its central axial line and the upward and downward inclination of the mirror surface.

When the mirror visor 3 is at its fully extended position, such angular adjustments of the mirror member 1 is possible because the cam follower end 50b of the lock lever 50 is riding upon the cam nose 46 and the engagement end 50a is disengaged from the support rod 47.

On the other hand, when a rearward force is applied to the mirror visor 3, the ball clutches 44 interposed between the upper surface of the base 5 and the lower surface of the outer sleeve 10 are disengaged and the mirror visor 3 is allowed to turn around the pivot boss 9 projecting upright from the base 5 and be brought close to the vehicle body. Simultaneously as the rotation of the mirror visor 3, the cam follower end 50b of the lock lever 50 is released from the cam nose 46 through a relative rotation between the cam plate 8 (or the base 5) and the mirror visor 3 (or the bracket 48) and the engagement end 50a of the lock lever 50 comes into engagement with the support rod 47 under the biasing force of the coil spring 51. As a result, the support rod 47 becomes immobile relative to the bracket 48, and the bracket 48 and the mirror holder 2 are brought integrally together by way of the support rod 47.

As the mirror visor 3 is thus rotated around the vertical axial line as a retracting movement, the vertical driven rod 25 is also rotated via the conversion arm 28 and the clutch unit 30, and the rotation of the vertical driven rod 25 is transmitted to the actuation lever 12 via the linkage mechanism including the first rod 29, the pivot joint 27 and the vertical drive rod 20. When the actuation lever 12 has reached an extreme end of its rotative movement around the vertical pivot axis, the inner edges of the openings 35 of the frame 37 forming the clutch unit 30 are disengaged from the notches 45 of the vertical driven rod 25 and ride over the circular surface of the vertical driven rod 25, compressing the coil spring 36 received in the frame 37. Thereby, the mirror visor 3 is retracted to its rearward position. When the mirror visor 3 is pushed forward to its fully extended position, the mirror visor 3 returns to and is retained at its fully extended original position by virtue of the ball clutches 44 and the coil spring 7, and the conversion arm 28 also returns to and is retained at its original position by virtue of the engagement between the edges of the opening 35 of the clutch unit 30 with the notches 45 of the vertical driven rod 25.

In this case, since the angular orientation of the mirror member 1 is fixed by the lock lever 50 throughout the retracting movement and the extending movement of the mirror visor 3, the angular orientation is always conserved and, therefore, there is no need to readjust the angular orientation of the mirror member after the mirror visor 3 is restored to its original normal position. In particular, as opposed to the prior art, since there is no need to deliberately apply a suitable amount of frictional force to the pivot ball 13 of the actuation lever 12 in order to keep the linkage mechanism immobile during the retraction movement of the mirror visor 3, the operation of the actuation lever 12 during the normal adjusting of the angular orientation of the mirror member 1 can be made with a very small force.

FIGS. 9 through 13 show a second embodiment of the present invention, and the parts corresponding to those of the previous embodiment are denoted with like numerals, in many cases without describing them again.

Figure 12:
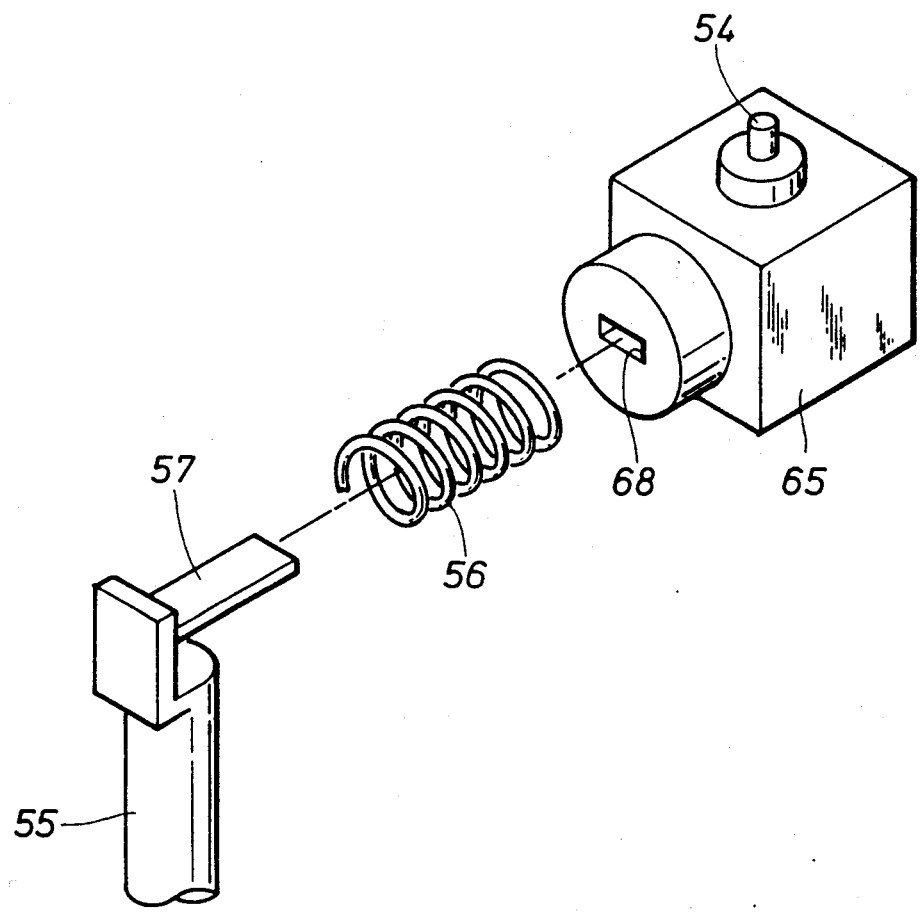
FIG. 12 is a fragmentary exploded perspective view of the clutch mechanism of the second embodiment for allowing the mirror visor to be retracted without interfering with the linkage mechanism.
Figure 13:
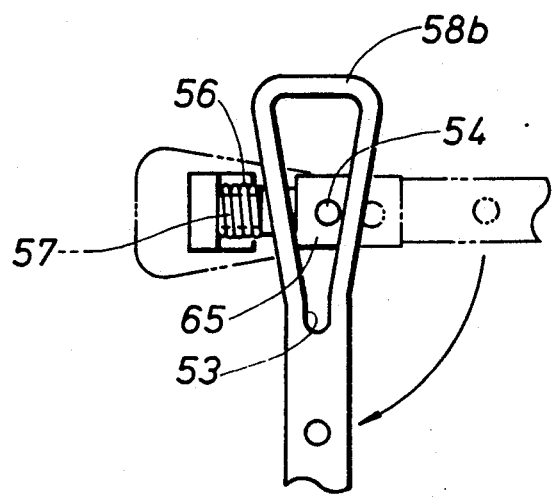
FIG. 13 is a plan view of the clutch mechanism of FIG. 13.

According to this embodiment, a lateral arm 60 projects laterally from a lower end of the vertical drive rod 20, and a similar first arm 61 projects laterally from a lower end of the vertical driven rod 55. The free end of the lateral arms 60 and first arm 61 is provided with a ball pivot 60a or 61a. A lateral rod 59 is passed through the vehicle door, and is coupled with the ball pivots 60a and 61a at its either end. As best shown in FIG. 12, the upper end of the vertical driven rod 55 is provided with a second arm 57 extending radially and integrally therefrom, and the free end of the second arm 57 is received in a recess 68 provided in a block member 65 so that the block member 65 may be telescopically slid along the second arm 57.

A guide rod 52 integrally projects from the bracket 48 in parallel with the vertical driven rod 55, and a middle part 58a of a conversion arm 58 is supported by this guide rod 52 so as to be rotatable around and slidable along this guide rod 52. A first end 58c of the conversion arm 58 is coupled with the lateral bar 39b in the same way as the conversion arm 28 of the previous embodiment but a second end 58b of the conversion arm 58 is provided with a slot 53 which is progressively wider towards its inner most end of the part most remote from the guide rod 52. The block member 65 is provided with a guide pin 54 which projects vertically from the block member 65 and is received in the slot 53 of the conversion arm 58. A washer 69 is attached to the free end of the guide pin 54 so as to positively retain the pin 54 in the slot 53. Further, a compression coil spring 56 is fitted on the second arm 57 and is interposed between the upper end of the vertical drive rod 55 and the block member 65. Thus, a clutch unit 30 which is similar in function to the clutch unit 30 of the previous embodiment is formed by the second arm 57, the block member 65, the compression coil spring 56, the guide pin 54, and the guide slot 53 of the conversion arm 58.

Now the operation of the second embodiment of the present invention is described in the following.

Figure 11:
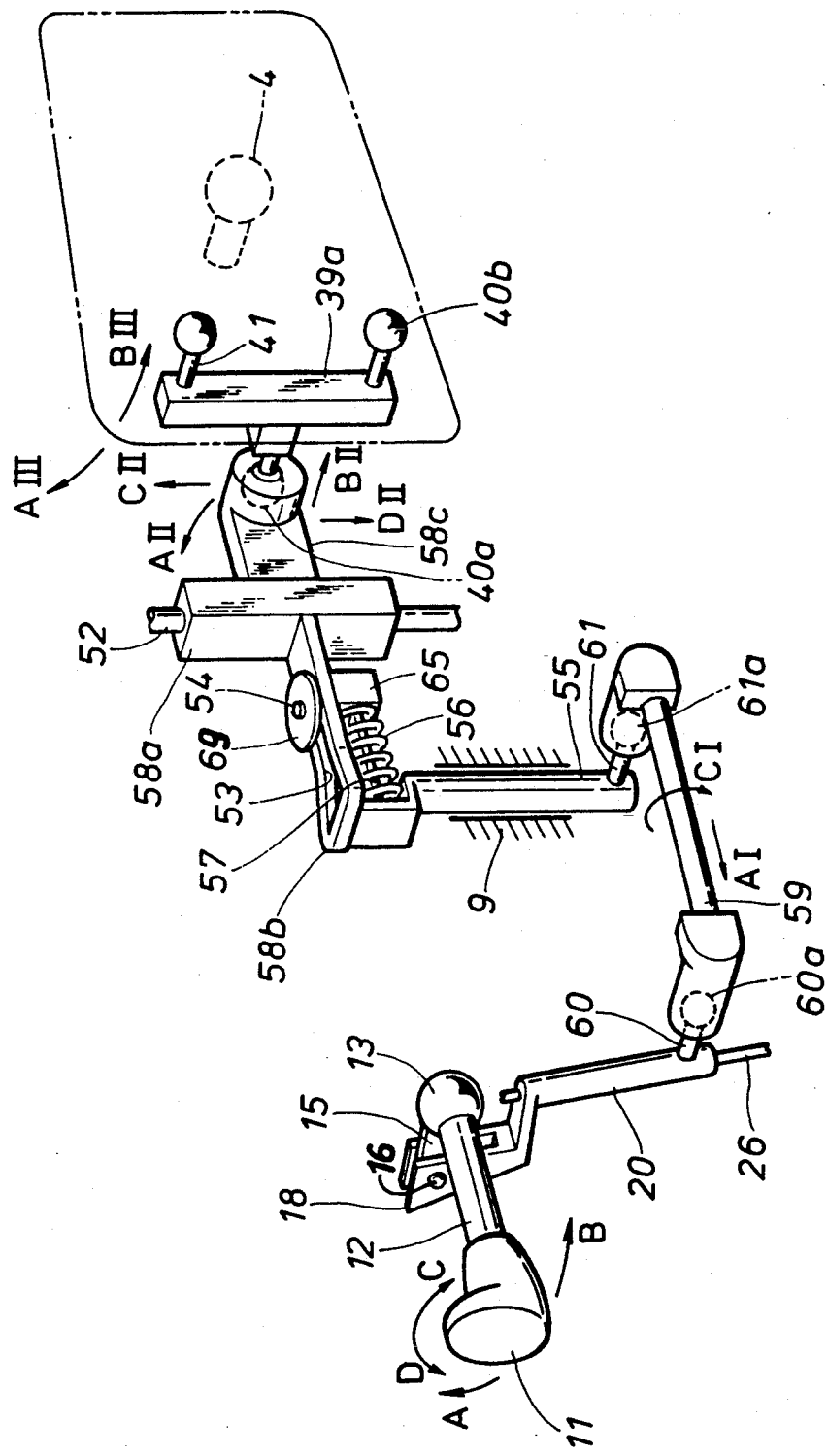
FIG. 11 is a perspective view showing the linkage mechanism of the second embodiment for converting the movement of the knob of the actuation lever into the angular movement of the mirror member.

When the mirror visor 3 is fully extended, by rotating the knob 11 to the left around the vertical axial line passing through the ball pivot 13 (in the direction A as indicated in FIG. 11), the vertical drive rod 20 is rotated in clockwise direction as seen from above via the extension arm 15 and the L-shaped swing piece 18, and this in turn causes the lateral rod 59 to be longitudinally moved toward the vehicle body as indicated by the arrow AI in FIG. 11, via the lateral arm 60 and the pivot ball 60a. This is transmitted as a clockwise rotation of the vertical driven rod 55 as seen from above, via the first arm 61 and the pivot ball 61a. As a result, the pin 54 applies a pressure to the lateral edge of the guide slot 53 in such a direction as to swing the first end 58c of the conversion arm 58 on the other side of the guide rod 52 to be swung away from the mirror member 1 as indicated by the arrow AII in FIG. 11. Thus, the mirror surface of the mirror member 1 is adjusted to face more towards the vehicle body through an angular movement around the vertical Y-axis.

Conversely, when the knob 11 is turned to the right around the vertical axial line passing through the ball pivot 13 (in the direction B as indicated in FIG. 11), the vertical drive rod 20 is rotated in counter-clockwise direction as seen from above via the extension arm 15 and the L-shaped swing piece 18, and this in turn causes the lateral rod 59 to be longitudinally moved away from the vehicle body, via the lateral arm 60 and the pivot ball 60a. This is transmitted as a counter-clockwise rotation of the vertical driven rod 55 as seen from above, via the first arm 61 and the pivot ball 61a. As a result, the pin 54 applies a pressure to the lateral edge of the guide slot 53 in such a direction as to swing the first end 58c of the conversion arm 58 on the other side of the guide rod 52 towards the mirror member 1 as indicated by the arrow BII in FIG. 11. Thus, the mirror surface of the mirror member 1 is adjusted to face more away from the vehicle body through an angular movement around the vertical Y-axis.

Thus, there is a favorable correspondence between the leftward and rightward movement of the actuation lever 12 and the inward and outward inclination of the mirror surface.

When the actuation lever 12 is turned around its central axial line in clockwise direction (as indicated by the arrow C in FIG. 11), the L-shaped swing piece 18 along with the vertical drive rod 20 is lifted via the extension arm 15 and the pivot pin 16. The lateral arm 60 is also lifted, and this movement is transmitted to the lateral rod 59 as its clockwise rotation around its central axial line as seen from the passenger compartment, as indicated by the arrow CI in FIG. 11, and this movement is converted into the upward movement of the vertical driven rod 55 via the first arm 61 and the ball pivot 61a. This movement is transmitted to the conversion arm 58 as its upward movement as indicated by the arrow CII in FIG. 11 via the second arm 57, the block member 65, and the washer 69a. Thus, the mirror member 1 is inclined rearward around the horizontal X-axis or directed more downward. Likewise, when the actuation lever 12 is turned around its central axial line in counter-clockwise direction (as indicated by the arrow D in FIG. 11), the L-shaped swing piece 18 along with the vertical drive rod 20 is lowered via the extension arm 15 and the pivot pin 16. The lateral arm 60 is also lowered, and this movement is transmitted to the lateral rod 59 as its counter-clockwise rotation around its central axial line as seen from the passenger compartment. This movement is converted into the downward movement of the vertical driven rod 55, and further to the conversion arm 58 as its downward movement as indicated by the arrow DII in FIG. 11. Thus, the mirror member 1 is inclined forward around the horizontal X-axis or directed more upward.

Thus, there is a favorable correspondence between the leftward and rightward rotative movement of the actuation lever 12 around its central axial line and the upward and downward inclination of the mirror surface.

According to this embodiment, when the mirror visor 3 is retracted from its fully extended position, the conversion arm 58 is also pivoted around its guide rod 52, and the lateral edge of the opening 53 bears upon the guide pin 54. Since the guide pin 54 is capable of moving towards the vertical driven rod 55 against the spring force of the coil spring 56, the rotation of the conversion arm 58 around the pivot axis of the retracting movement of the mirror visor 3 is accommodated. Further, since the linkage mechanism intervening between the actuation lever 12 and the vertical driven rod 55 is fixedly secured by the frictional force at the ball pivot 13 against the force applied by the conversion arm 58 to the guide pin 54 during the retracting movement and the extending movement of the mirror visor 3, the angular orientation of the mirror member 1 is always conserved and, therefore, there is no need to readjust the angular orientation of the mirror member 1 after the mirror visor 3 is restored to its original normal position.

I claim:

1. A turn-over type rearview door mirror for a vehicle, comprising:
   a stay member securely attached to a vehicle door and carrying a base member;
   a mirror visor pivotally supported by said base member around a vertical retraction pivot axis;
   detent means for retaining said mirror visor at a fully extended position and at a fully retracted position;
   a rearwardly facing mirror member received in said mirror visor and pivotally supported so as to be angularly movable around a horizontal axial line and a vertical axial line;
   a lateral rod extending through said vehicle door so as to be vertically slidable and rotatable around a vertical pivot axis located at an inner end thereof;

knob means coupled with the inner end of said lateral rod via an actuation linkage mechanism for converting a lateral rotative movement of said knob means around a vertical axial line and a rotative movement of said knob means around another axial line extending substantially perpendicularly to said vehicle door into said rotative movement around said vertical pivot axis and said vertical sliding movement of said lateral rod, respectively;

a vertical driven rod disposed in parallel with said retraction pivot axis and guided so as to be rotatable around and slideable long its central axial line;

a first arm member extending laterally from a lower end of said vertical driven rod, said first arm member having a free end which is pivotally and telescopically coupled with a free end of said lateral rod for converting said vertical sliding movement and said rotative movement of said lateral rod into said sliding movement and said rotative movement of said vertical driven rod, respectively;

a second arm member extending laterally form an upper end of said vertical driven rod;

a connecting rod unit having one end pivotally attached to a free end of said second arm member, and having another end pivotally attached to a reverse surface of said mirror member at an area which is displaced from an intersection of said horizontal axial line and said vertical axial line of said mirror member, such that said sliding movement and said rotative movement of said vertical driven rod is transmitted via said second arm member into angular movement of said mirror member around said horizontal axial line and said vertical axial lie, respectively; and a clutch unit interposed between a base end of said second arm member and said upper end of said vertical driven rod, comprising a cam part provided at said upper end of said vertical driven rod, a cam follower part provided at said base end of said second arm member for cooperation with said cam part, and a spring member urging said cam follower part toward said cam part so as to elastically follow said second arm member, along with said mirror visor, to be turned around said vertical driven rod against a biasing force of said spring member which tends to restore said second arm member to its neutral position with respect to said vertical driven rod.

2. A turn-over type rearview door mirror according to claim 1, wherein said knob means comprises an actuation lever which projects into a passenger compartment through an opening in said door so as to be rotatable around its own axial line and rotatable around a vertical axial line, and a vertical drive rod guided for a vertical movement and a rotative movement along and around its central axial line and having an L-shaped upper end which is coupled with an extension extending laterally from a base end of said actuation lever, said lateral rod integrally and laterally projecting from a lower part of said vertical drive rod.

3. A turn-over type rearview door mirror according to claim 2, wherein said vertical drive rod consists of a tubular member and a vertical guide rod is passed through an inner hollow part of said vertical drive rod.

4. A turn-over type rearview door mirror according to claim 1, wherein a base end of said another end of said connecting rod unit is integrally connected to a middle part of a vertical bar member which is pivotally coupled with a reverse surface of said mirror member at its either end in a symmetrical relationship with respect to said horizontal axial line.

5. A turn-over type rearview door mirror according to claim 1, wherein a base end of said second arm member is provided with an opening through which said upper end of said vertical driven rod is passed, and said spring member urges said second arm member away from said vertical driven rod toward a free end of said second arm member, an edge of said opening being pressed against a part of said vertical driven rod facing away from said free end of said second arm member in such a manner that said edge of said opening and said part of said vertical driven rod define said cam follower part and said cam part of said clutch unit, respectively.

6. A turn-over type rearview door mirror according to claim 1, wherein said vertical driven rod is coaxial with said retraction pivot axis.

7. A turn-over type rearview door mirror for a vehicle, comprising:

a stay member securely attached to a vehicle door and carrying a base member;

a mirror visor pivotally supported by said base member around a vertical retraction pivot axis;

detent means for retaining said mirror visor at a fully extending position and at a fully retracted position;

a rearwardly facing mirror member received in said mirror visor and pivotally supported so as to be angularly movable around a horizontal axial line and a vertical axial line;

knob means projecting form said door into a passenger compartment;

a vertical driven rod disposed in parallel with said retraction pivot axis and guided so as to be rotatable around and slidable along its central axial line;

linkage means for converting a lateral rotative movement of said knob means around a vertical axial line and a rotative movement of said knob means around another axial line extending substantially perpendicularly to said vehicle door into said rotative movement and said sliding movement of said vertical driven rod, respectively;

an arm member extending laterally from an upper end of said vertical driven rod;

a connecting rod unit having on end pivotally attached to a free end of said arm member, and having another end pivotally attached to a reverse surface of said mirror member at an area which is displaced form an intersection of said horizontal axial line and said vertical axial line of said mirror member, such that said sliding movement and said rotative movement of said vertical driven rod is transmitted via said arm member into angular movement of said mirror member around said horizontal axial line and said vertical axial line, respectively; and, brake means interposed between said mirror member and said mirror visor for selectively retaining a current angular position of said mirror member with respect to said mirror visor when said mirror visor is retracted from a neutral position around said retraction pivot axis.

8. A turn-over type rearview door mirror according to claim 7, further comprising brake actuating means comprising a lever member pivotally supported by said mirror visor and having one end which can selectively retain said mirror member by engaging therewith as a part of said brake means, and cam means provided in said base member so as to cooperate with another end of said lever member and thereby activate said brake means when said mirror visor is retracted from its neutral position around said retraction pivot axis.

9. A turn-over type rearview mirror according to claim 8, wherein said brake means comprises a brake lever pivotally supported by said mirror visor, and biasing means, said brake lever being provided with a first end which engages with a cam surface provided in said base member, and a second end which selectively locks up said mirror holder of said mirror member when said first end is brought into contact with a cam nose part of said cam surface against a biasing force of said biasing means which normally urges said second end out of locking up said mirror holder.

10. A turn-over type rearview door mirror according to claim 9, wherein said cam surface is provided in a horizontal plane of said base member surrounding said retraction pivot axis, and said pivot axis of said brake lever extends substantially perpendicularly to a major surface of said mirror member.

11. A turn-over type rearview door mirror for a vehicle, comprising:
 a stay member securely attached to a vehicle door and carrying a base member;
 a mirror visor pivotally supported by said base member around a vertical guide rod;
 detent means for retaining said mirror visor at a fully extended position and at a fully retracted position;
 a rearwardly facing mirror member received in said mirror visor and pivotally supported so as to be angularly movable around a horizontal axial line and a vertical axial line;
 a lateral rod extending through said vehicle door so as to be rotatable around and slidable along its central axial line;
 knob means coupled with an inner end of said lateral rod via an actuation linkage mechanism for converting a lateral rotative movement of said knob means around a vertical axial line and a rotative movement of said knob means around another axial line extending substantially perpendicularly to said vehicle door into said sliding movement and said rotative movement of said lateral rod, respectively;
 a vertical driven rod provided adjacent an outer end of said lateral rod and guided so as to be rotatable around and slidable along its central axial line;
 a lateral arm member extending laterally from an upper end of said vertical driven rod;
 a vertical guide rod extending substantially in parallel with said vertical driven rod;
 a conversion arm supported by said vertical guide rod at a middle part thereof so as to be rotatable about and slidable along a central axial line of said vertical guide rod, and provided with a first end engaged with a free end of said lateral arm member for converting a rotative and vertical movement of said vertical driven rod transmitted thereto into a rotative and sliding movement of said conversion arm via said lateral arm member;
 a connecting rod unit having one end pivotally attached to a second end of said conversion arm, and having another end pivotally attached to a reverse surface of said mirror member at an area which is displaced from an intersection of said horizontal axial line and said vertical axial line of said mirror member, such that said sliding movement and said rotative movement of said conversion arm is transmitted into angular movement of said mirror member around said horizontal axial line and said vertical axial line, respectively; and
 a clutch unit interposed between a free end of said lateral arm member and said first end of said conversion arm, comprising a cam part provided at said first end of said conversion arm, a cam follower part provided at said free end of said lateral arm member for cooperating with said cam part, and a spring member urging said cam follower part toward said cam part so as to elastically allow said conversion arm, along with said mirror visor, to be turned around said vertical guide rod against a biasing force of said spring member which tends to restore said conversion arm to a neutral position with respect to said vertical guide rod.

12. A turn-over type rearview door mirror according to claim 11, wherein said cam part comprises a vertical pin member carried by an upper end of said vertical driven rod so as to be movable radially and urged by said spring member in a radially outward direction, and said cam follower part comprises a slot provided in said first end of said conversion arm for receiving said pin member therein and is progressively wider towards an inner most part of said first end of said conversion arm.

13. A turn-over type rearview door mirror according to claim 11, wherein said knob means comprises an actuation lever which projects into a passenger compartment through an opening in said door so as to be rotatable around its own axial line and rotatable around a vertical axial line, and a vertical drive rod guided for a vertical movement and a rotative movement along and around its central axial line and having a L-shaped upper end which is coupled with an extension extending laterally from a base end of said actuation lever, said vertical driven rod being provided with a lateral arm extending from a lower part thereof and pivotally coupled with an inner end of said lateral rod.

14. A turn-over type rearview door mirror according to claim 13, wherein said vertical drive rod consists of a tubular member and a vertical guide rod is passed through an inner hollow part of said vertical drive rod.

15. A turn-over type rearview door mirror according to claim 11, wherein a base end of said another end of said connecting rod unit is integrally connected to a middle part of a vertical bar member which is pivotally coupled with a reverse surface of said mirror member at its either end in a symmetric relationship with respect to said horizontal axial line.

* * * * *